(12) United States Patent
Hursig et al.

(10) Patent No.: US 7,871,044 B2
(45) Date of Patent: Jan. 18, 2011

(54) METHOD FOR VERTICAL TAKEOFF FROM AND LANDING ON INCLINED SURFACES

(75) Inventors: David C. Hursig, Albuquerque, NM (US); Steven D. Martinez, Albuquerque, NM (US)

(73) Assignee: Honeywell International Inc., Morristown, NJ (US)

(*) Notice: Subject to any disclaimer, the term of this patent is extended or adjusted under 35 U.S.C. 154(b) by 1128 days.

(21) Appl. No.: 11/752,497

(22) Filed: May 23, 2007

(65) Prior Publication Data

US 2010/0012776 A1 Jan. 21, 2010

(51) Int. Cl.
*G05D 1/08* (2006.01)
(52) U.S. Cl. .......................................... 244/183; 244/81
(58) Field of Classification Search ............... 244/81, 244/82, 183, 186, 187, 190; 73/170.02
See application file for complete search history.

(56) References Cited

U.S. PATENT DOCUMENTS

| | | | | |
|---|---|---|---|---|
| 3,302,908 A * | 2/1967 | Lazareff | ..................... | 244/183 |
| 3,857,533 A * | 12/1974 | Mason | ..................... | 244/17.17 |
| 4,062,507 A * | 12/1977 | Felder | ..................... | 244/17.17 |
| 7,032,861 B2 | 4/2006 | Sanders, Jr. et al. | ....... | 244/23 A |
| 7,044,422 B2 | 5/2006 | Bostan | ..................... | 244/7 B |

* cited by examiner

*Primary Examiner*—Timothy D Collins
*Assistant Examiner*—Michael Kreiner
(74) *Attorney, Agent, or Firm*—Shumaker & Sieffert, P.A.

(57) ABSTRACT

Takeoff and landing modes are added to a flight control system of a Vertical Take-Off and Landing (VTOL) Unmanned Air Vehicle (UAV). The takeoff and landing modes use data available to the flight control system and the VTOL UAV's existing control surfaces and throttle control. As a result, the VTOL UAV can takeoff from and land on inclined surfaces without the use of landing gear mechanisms designed to level the UAV on the inclined surfaces.

7 Claims, 8 Drawing Sheets

METHOD FOR VERTICAL TAKEOFF FROM AND LANDING ON INCLINED SURFACES

GOVERNMENT RIGHTS

The United States Government has acquired certain rights in this invention pursuant to Contract No. HR0011-05-C-0043 awarded by DARPA.

FIELD

The present invention relates generally to vertical takeoff and landing, and more particularly, relates to vertical takeoff from and landing on inclined surfaces.

BACKGROUND

To date, Unmanned Air Vehicles (UAVs) have typically been fixed wing air vehicles; however, other types of UAV are currently being developed for both military and civilian use. One type of UAV currently being developed is a ducted-fan, vertical take-off and landing (VTOL) air vehicle. The VTOL UAV may be capable of operating in a variety of areas, such as constrained urban areas and non-urban areas commonly described as having "complex" terrain.

The VTOL UAV is designed to perform autonomous missions that generally require the UAV to launch vertically, fly along a pre-planned flight plan, and land vertically. For example, at some point while flying a mission, the UAV may be expected to perform "perch and stare" observations. Perch and stare observations require the UAV to land vertically, perform observations (possibly for an extended period of time with engine shutdown), and takeoff vertically.

A mission may require the VTOL UAV to takeoff from and land on unprepared ground or vehicle decks. The takeoff and landing surfaces may not be level and, for example, may be inclined up to as much as 30 degrees or more. Traditionally, mechanical landing gear mechanisms have been designed to level the UAV so that the UAV can vertically takeoff from and land on inclined surfaces. Unfortunately, these mechanical landing gear mechanisms are complex and heavy, which may compromise both the durability and flight performance of the UAV. Additionally, some of these mechanical landing gear mechanisms are limited to inclines of 10 degrees or less, which may limit the UAV from performing missions in certain terrain conditions.

Thus, it would be beneficial for a VTOL UAV to be able to vertically takeoff from and land on an inclined surface without using a mechanical landing gear mechanism to compensate for the incline.

SUMMARY

A method for landing an unmanned air vehicle on an inclined surface is described. The method includes descending vertically above the inclined surface, detecting a pressure differential caused by the inclined surface, counteracting motion caused by the pressure differential, detecting when the unmanned air vehicle contacts the inclined surface, and when the unmanned air vehicle contacts the inclined surface, rotating the unmanned air vehicle until the unmanned vehicle has landed on the inclined surface.

To counteract motion caused by the pressure differential, vanes of the unmanned air vehicle may be adjusted. Additionally, the throttle of the unmanned air vehicle may be adjusted to counteract the motion caused by the pressure differential. A flight control system of the unmanned air vehicle may detect a landing touch condition.

To rotate the unmanned air vehicle, the vanes of the unmanned air vehicle may be adjusted. Adjusting the vanes may include moving the vanes to counteract motion induced when the unmanned air vehicle contacts the inclined surface. Additionally, the throttle of the unmanned air vehicle may be adjusted to control the rate of descent of the vehicle. Adjusting the throttle may include increasing the throttle to counteract gravitational forces.

A method for vertical takeoff of an unmanned air vehicle from an inclined surface is also described. The method includes receiving a command to launch, determining attitude orientation, orienting vanes of the unmanned air vehicle to counteract gravity, increasing thrust to release landing gear of the unmanned air vehicle from the inclined surface, and ascending substantially perpendicular from the inclined surface.

Determining attitude orientation may identify whether the unmanned air vehicle is located on the inclined surface. Orienting vanes may include adjusting the vanes to a positive angle based on the attitude orientation determination. The method may also include ascending substantially vertically at a distance above the inclined surface.

A method for vertical takeoff from and landing on inclined surfaces is also described. The method includes providing a takeoff mode in a flight control system of an unmanned air vehicle. The takeoff mode adjusts at least one vane and a thrust of the unmanned air vehicle so as to initially ascend substantially perpendicular to the inclined surface. The method also includes providing a landing mode in the flight control system of the unmanned air vehicle. The landing mode adjusts the at least one vane and the thrust of the unmanned air vehicle upon detecting that the unmanned air vehicle has contacted the inclined surface at a contact point so as to rotate the unmanned air vehicle about the contact point until the unmanned air vehicle has landed.

The takeoff mode may adjust the vanes based on an attitude orientation determination. The landing mode may rotate the unmanned air vehicle in an uphill direction. Additionally, the landing mode counteracts motion induced by the contact point.

These as well as other aspects and advantages will become apparent to those of ordinary skill in the art by reading the following detailed description, with reference where appropriate to the accompanying drawings. Further, it is understood that this summary is merely an example and is not intended to limit the scope of the invention as claimed.

BRIEF DESCRIPTION OF THE DRAWINGS

Presently preferred embodiments are described below in conjunction with the appended drawing figures, wherein like reference numerals refer to like elements in the various figures, and wherein.

DETAILED DESCRIPTION

Figure 1:
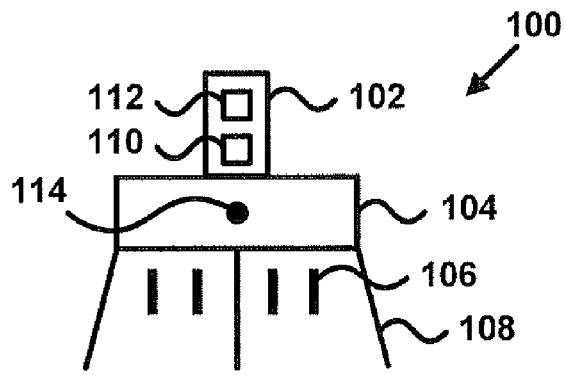
FIG. 1 is a block diagram of a Vertical Take-Off and Landing (VTOL) Unmanned Air Vehicle (UAV), according to an example.

FIG. 1 is a block diagram of a Vertical Take-Off and Landing (VTOL) Unmanned Air Vehicle (UAV) 100. Typically, the UAV 100 includes a fuselage 102, a duct 104, control vanes 106, and landing gear 108. The UAV 100's center of gravity 114 is typically above the control vanes 106. The UAV 100 includes other components as well and is not limited to any particular VTOL UAV design. For example, the UAV 100 may be an Organic Air Vehicle (OAV) or a Miniature Air Vehicle (MAV).

The fuselage 102 may be a housing that contains other components of the UAV 100. The fuselage 102 may contain an engine for powering the UAV 100 and storage of fuel, such as gasoline, for the engine. The fuselage 102 may also contain components for vehicle operation, such as a flight control system 110 and a navigation system 112.

The flight control system 110 may include a processor, a data storage device, and mode control software to control the UAV 100 in flight. The flight control system 110 receives inputs from the navigation system 112 and/or an operator of the UAV 100. Depending on the inputs and the mode type, such as a landing flight control mode and a take-off flight control mode, the flight control system 110 may adjust the vanes and throttle to control the movement of the UAV 110.

The navigation system 112 may include inertial measurement sensors, a global positioning satellite (GPS) sensor, an above ground level sensor, barometric pressure sensors, magnetometers, rate sensors, and accelerometers. Additionally, the navigation system 112 may include a processor and a data storage device. A navigation algorithm may be stored in the data storage device. The navigation system 112 may receive data from the sensors and the processor may execute the navigation algorithm to provide as an output a navigation solution. The navigation solution may be an estimate of the UAV 100's position, altitude, height above ground, attitudes (e.g., pitch, roll, yaw), attitude rates, velocity, and/or time.

The duct 104 includes a fan that draws in air through the duct 104 to provide lift. The fan draws air in through the top of the duct 104 and expels it out the bottom to provide thrust. The thrust produced by the duct 104 and fan combination is powerful enough to enable the UAV 100 to hover, as well as fly. The control vanes 106 may be located under the fan located within the duct 104. The control vanes 106 provide thrust vectoring for the UAV 100.

The landing gear 108 is the structure that supports the UAV 100 when not flying and allows the UAV 100 to land on the ground after a flight. The landing gear 108 may be a fixed or active mechanical landing gear mechanism. For example, the landing gear 108 may include three-point posts or a landing ring. As depicted in FIG. 1, the landing gear 108 has three-point posts; however, the invention is not limited to this type of landing gear.

Landing Flight Control Mode

Figure 2:
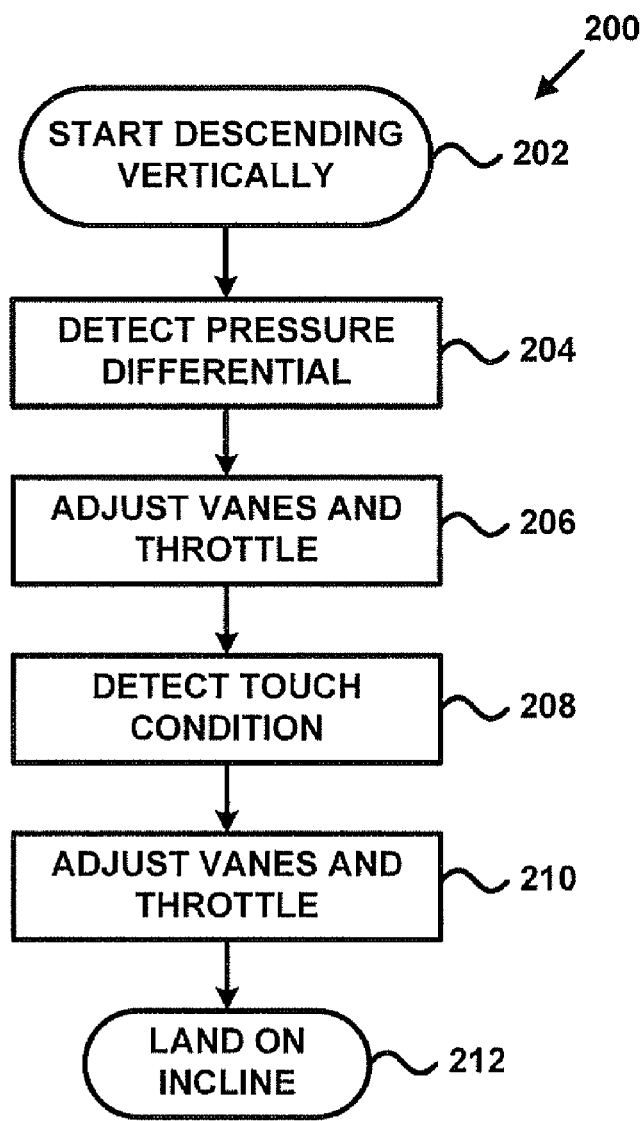
FIG. 2 is a flow chart of a method for vertical landing on an incline, according to an example.
Figure 3:
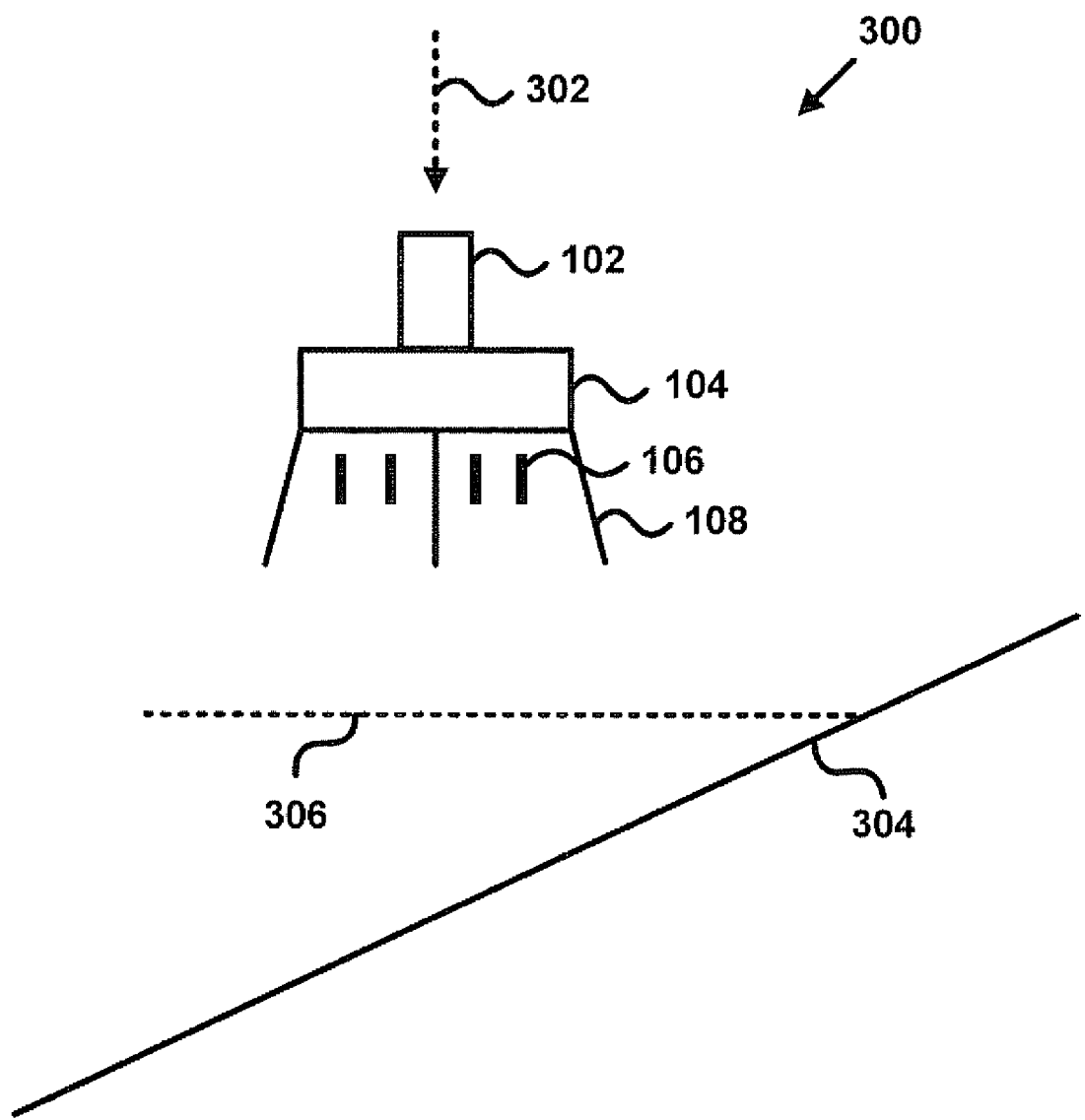
FIG. 3 is a pictorial diagram of the VTOL UAV depicted in FIG. 1 vertically descending above an incline, according to an example.

FIG. 2 is a flow chart of a method 200 for vertical landing on an incline. At block 202, the UAV 100 begins descending vertically under the control of a pre-existing flight control mode. FIG. 3 is a pictorial diagram 300 of the VTOL UAV 100 vertically descending 302 above an inclined surface 304.

The landing flight control mode is engaged either manually by the operator or automatically when the UAV's above ground level (AGL) sensor determines that the UAV 100 is at a predetermined height above the inclined surface 304. The landing flight control mode is preferably a software program that is executed by the flight control system 110. The landing flight control mode monitors the attitude orientation of the UAV 100 from data derived from the navigation system 112. In a normal descent, the UAV 100 is above an attitude 306 where the surface pressure affects the UAV 100 and the pressure differential across the lower duct 104 is uniform.

Figure 4:
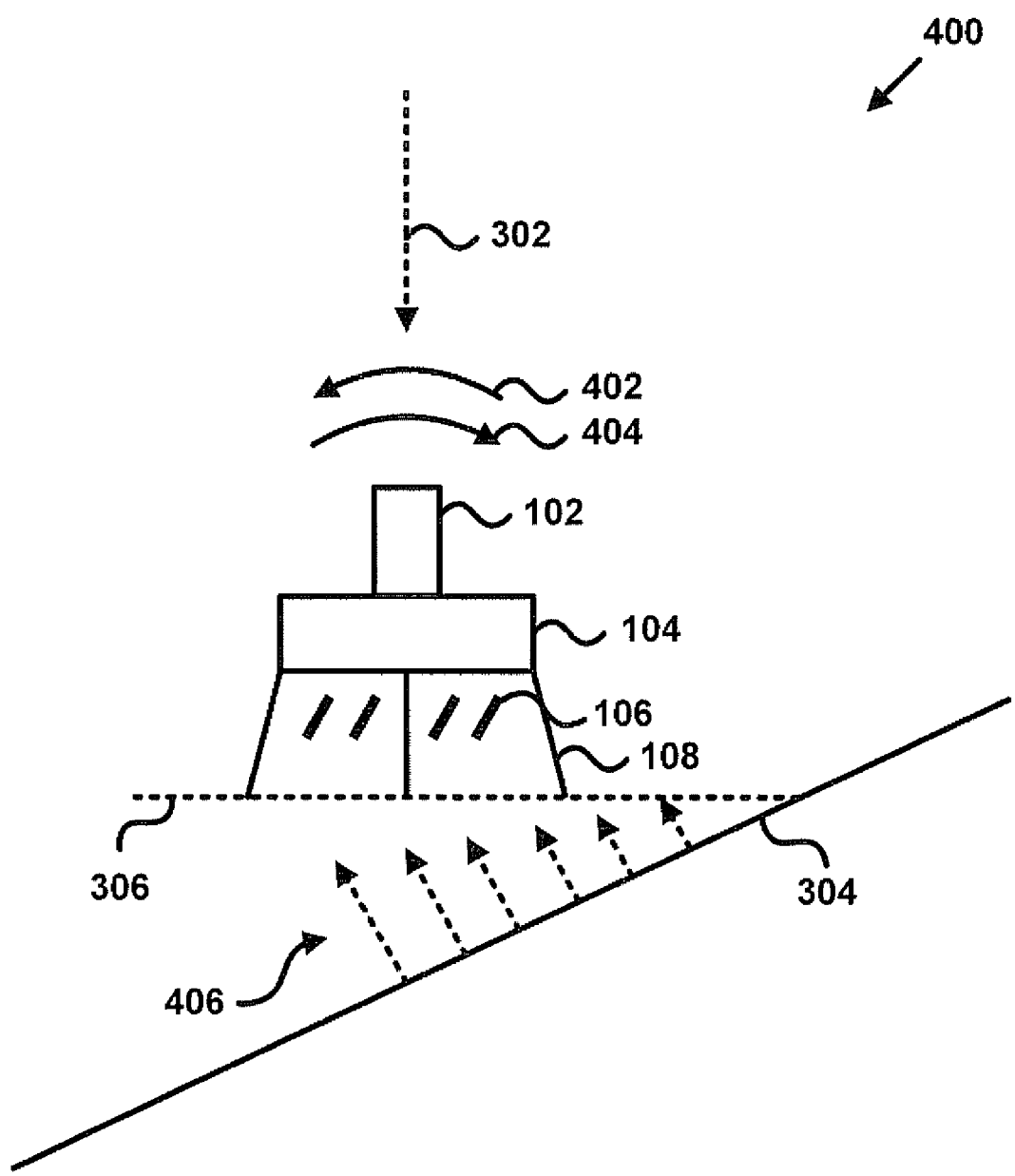
FIG. 4 is another pictorial diagram of the VTOL UAV depicted in FIG. 1 vertically descending above the incline, according to an example.

At block 204, the UAV 100 detects a pressure differential 406 as seen in FIG. 4. The pressure differential 406 may be inferred from the attitude data without the use of pressure sensors. Alternatively, the pressure differential 406 may be detected with the use of pressure sensors.

FIG. 4 is a pictorial diagram 400 of the VTOL UAV 100 as it further descends above the inclined surface 304. When descending against the inclined surface 304, the pressure differential 406 across the lower duct 104 is non-uniform. The flight control system 110 is operable to detect and compensate for the pressure differential 406 encountered by the UAV 100.

At block 206, the flight control system 110 detects and compensates for the pressure differential 406 by modulating the vanes 106 and controlling the throttle. The flight control system 110 counteracts the motion 404 induced by the surface pressure with a counteracting vane motion 402. The vane deflection may vary based on surface inclination, while the throttle setting is based on thrusting to maintain vehicle descent rate.

Figure 5:
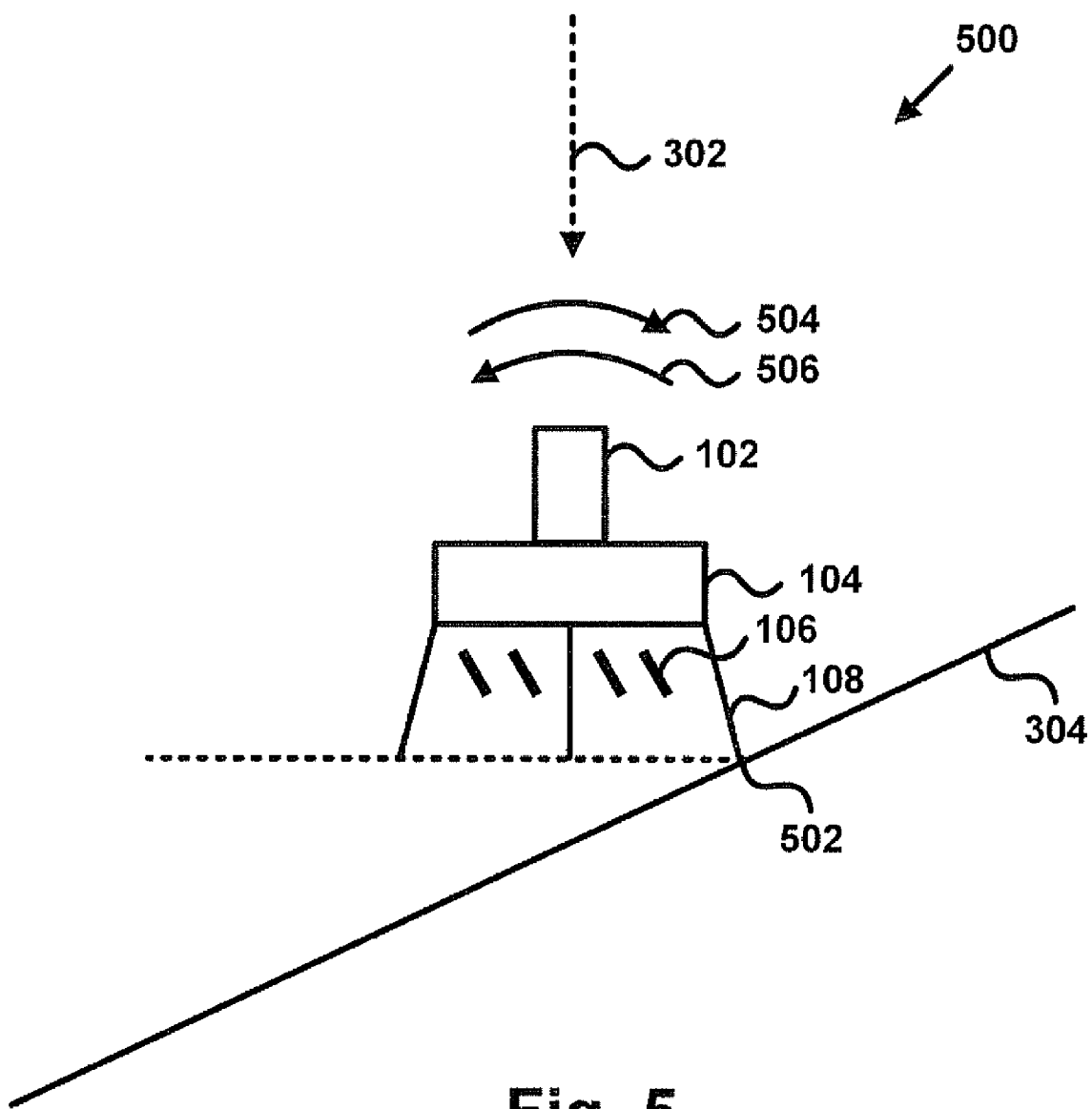
FIG. 5 is a pictorial diagram of the VTOL UAV depicted in FIG. 1 after the vehicle contacts the incline, according to an example.

At block 208, the flight control system 110 detects a landing touch condition as shown in FIG. 5. FIG. 5 is a pictorial diagram 500 of the UAV 100 after the UAV 100 contacts the inclined surface 304 at a contact point 502. When the contact with the inclined surface 304 induces an orientation change that cannot be corrected by the flight control system 110, the landing touch condition is satisfied. This condition may be detected by existing onboard sensors included in the navigation system 112.

Figure 8:
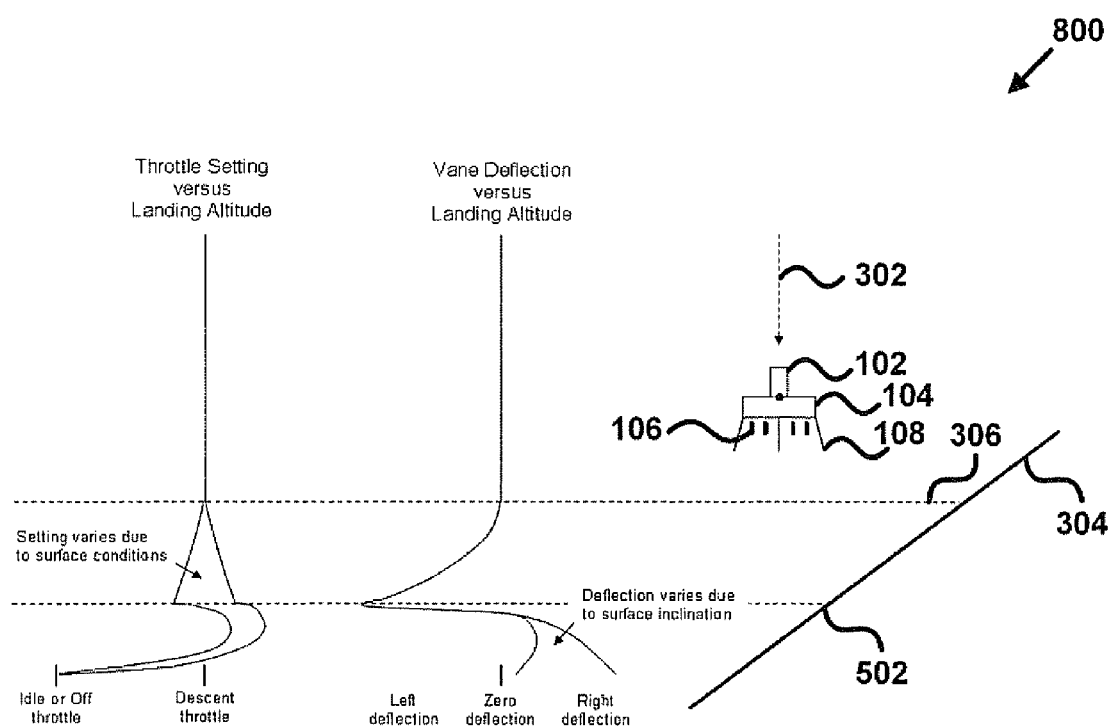
FIG. 8 is a chart showing throttle and vane deflection versus altitude during landing, according to an example.

At block 210, after the landing touch condition is detected, the vanes 106 are adjusted to provide thrust to impart a rotation to the UAV 100 in an uphill direction as illustrated in FIG. 5. The counteracting vane motion 504 is designed to counteract the motion 506 induced by the touch point 502. The throttle is also modulated as depicted in FIG. 8 to provide sufficient thrust to counteract gravitational forces on the UAV 100 while the vanes 106 are in transition, but not so much as to detach the landing gear 108 from the incline 304.

Figure 6:
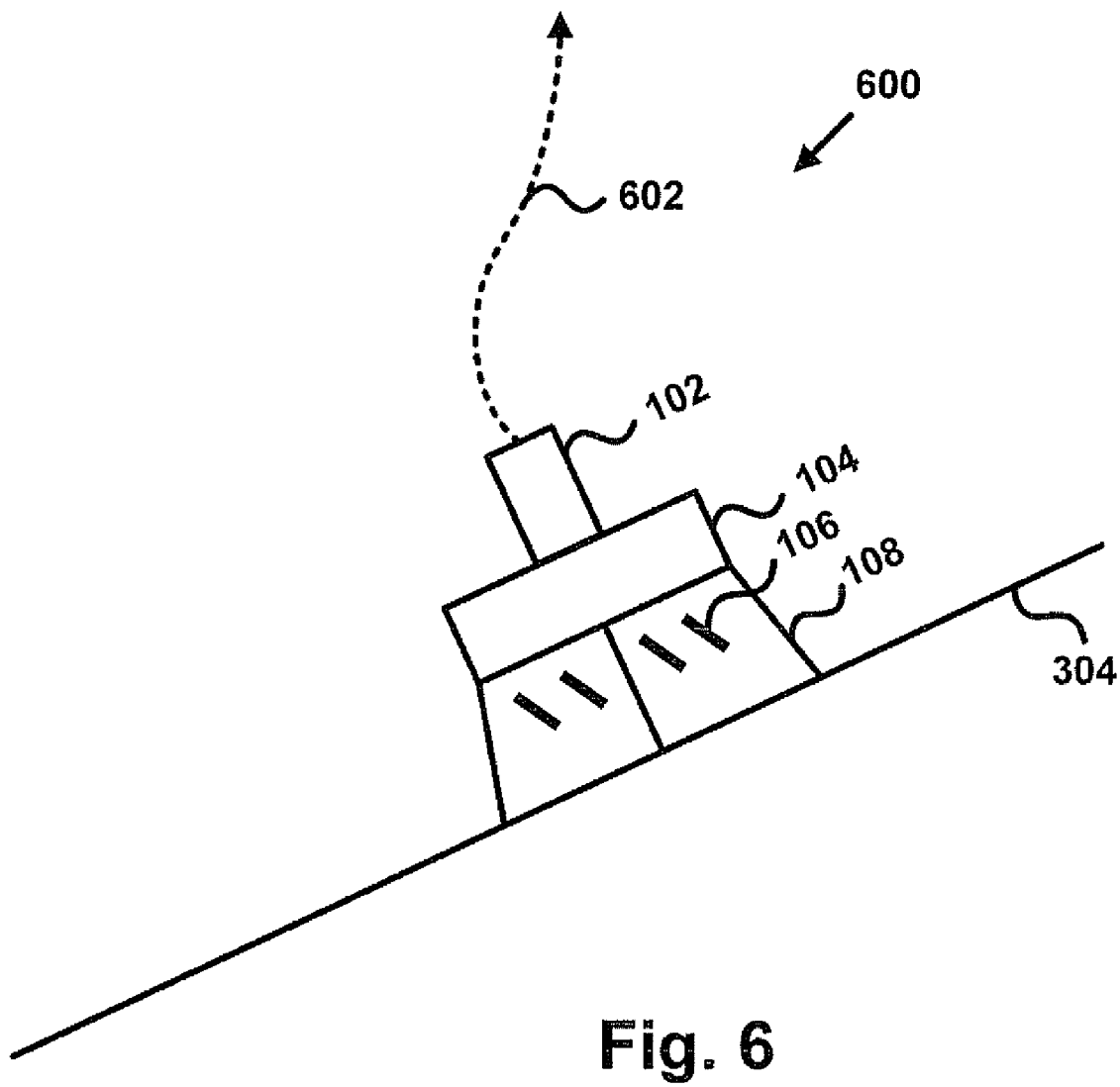
FIG. 6 is a pictorial diagram of the VTOL UAV depicted in FIG. 1 after the vehicle has landed on the incline, according to an example.

At block 212, the UAV 100 lands on the inclined surface 304 as depicted in FIG. 6. FIG. 6 is a pictorial diagram 600 of the UAV 100 after the UAV 100 has landed on the inclined surface 304. The landing flight control adjusts the vanes 106 to pivot the UAV 100 about the touch point 502 at a controlled rate to gently lower the UAV 100 until all of the landing gear 108 contact the inclined surface 304. At this point, the landing condition is satisfied.

The landing condition may be detected by existing onboard sensors as a decrease to zero of the vehicle attitude angular rate in spite of continued reductions in throttle. A secondary condition for the landing condition is that the onboard sensors detect that the UAV 100 has met the vehicle-specific tip-over angle. When the landing condition is met, the throttle is reduced to zero or idle to fully seat the UAV 100. The expected throttle settings and vane deflections during the landing flight control mode sequence are shown in FIG. 8.

Take-Off Flight Control Mode

Figure 7:
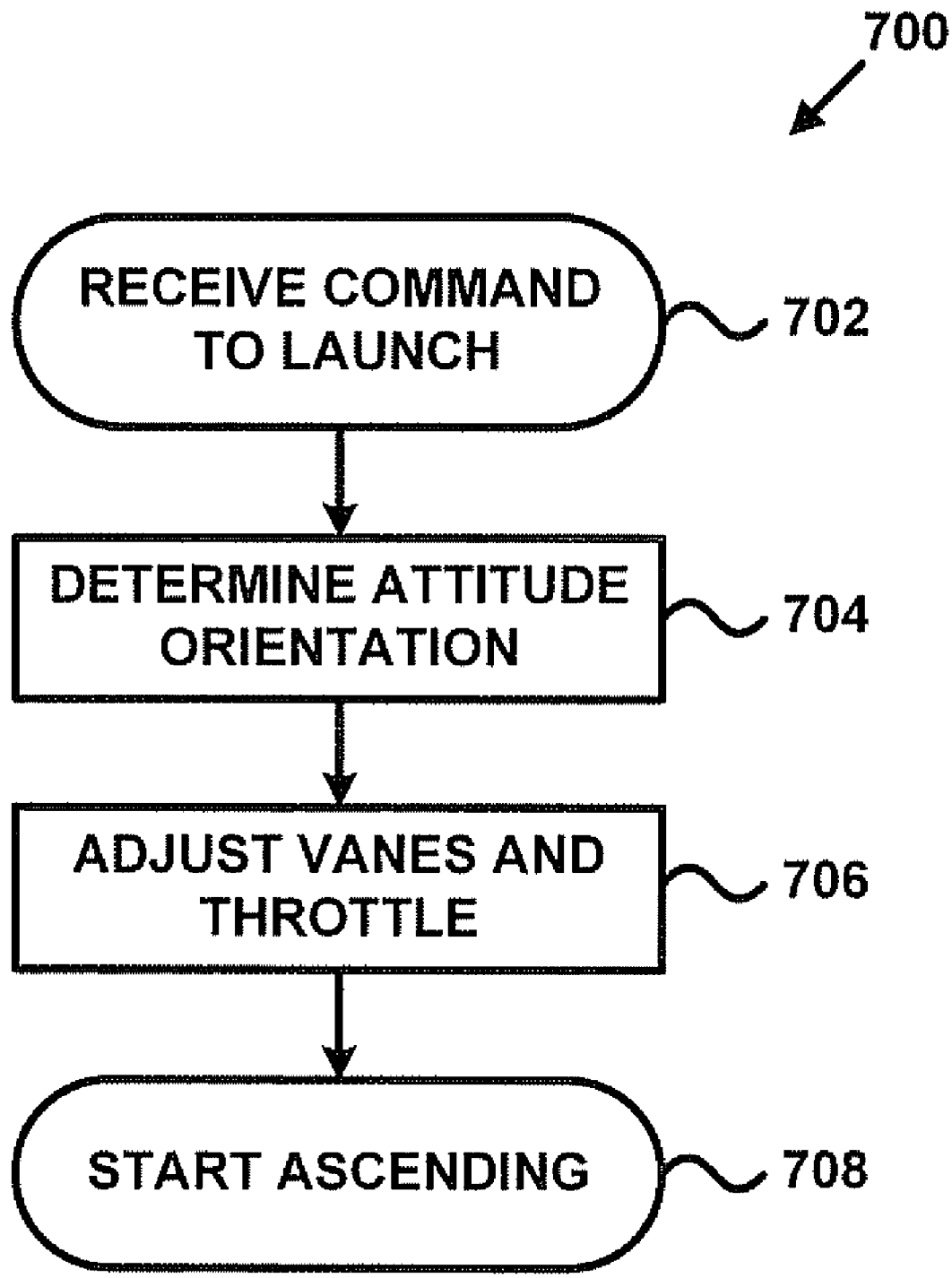
FIG. 7 is a flow chart of a method for vertical takeoff from the incline, according to an example.

FIG. 7 is a flow chart of a method 700 for vertical takeoff 602 (as shown in FIG. 6) from the inclined surface 304. At block 702, the UAV 100 receives a command to launch from an operator. Upon receipt of the launch control, a take-off flight control mode is engaged. The take-off flight control mode is preferably a software program that is executed by the flight control system 110.

At block 704, the take-off flight control mode determines the attitude orientation of the UAV 100 from data sourced by, for example, the navigation system 112. The attitude as measured by the navigation system 112 may indicate that the UAV 100 is positioned on the inclined surface 304.

Figure 9:
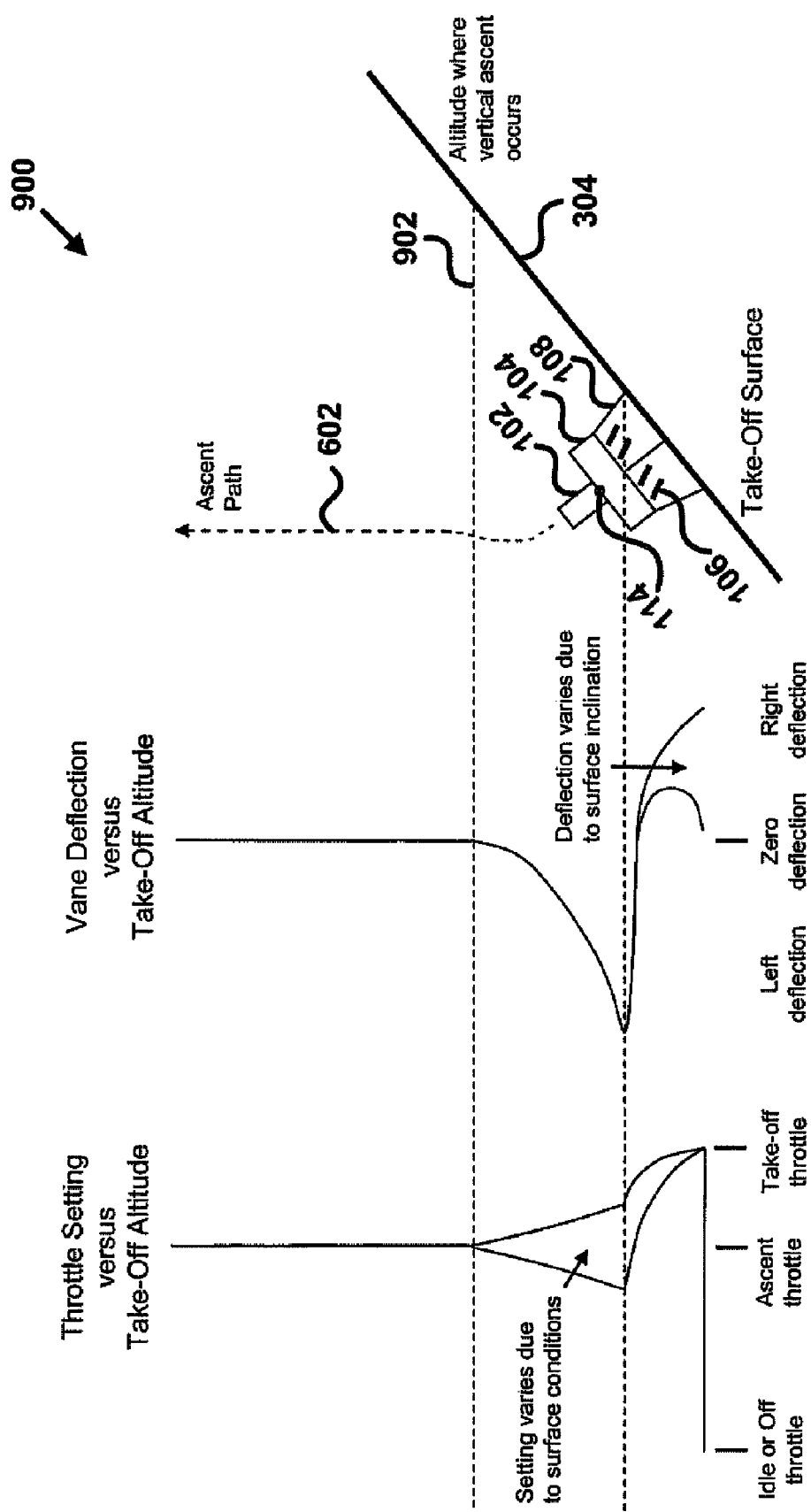
FIG. 9 is a chart showing throttle and vane deflection versus altitude during take-off, according to an example.

At block 706, the take-off flight control mode orients the vanes 106 to a positive angle as depicted in FIG. 6 based on onboard sensor determination of the vehicle attitude relative to the gravity vector. When the throttle is increased to generate take-off thrust, the vanes 106 are oriented to counteract gravity relative to the vehicle center-of-gravity 114 such that the UAV 100 is predisposed to release the landing gear 108 from the inclined surface 304 substantially simultaneously. The expected throttle settings and vane deflections during the take-off flight control mode sequence are shown in FIG. 9.

At block 708, the UAV 100 starts ascending, initially substantially perpendicular to the take-off surface. Once the UAV 100 is a distance 902 above the inclined surface 304, pre-existing flight controls are engaged to bring the UAV 100 to a full upright attitude for hover or transition to normal flight. For example, the UAV 100 may begin ascending vertically within several duct diameters above the takeoff surface.

By adding takeoff and landing modes to the UAV's flight control system, the landing gear may no longer be required to level the UAV 100 on the inclined surface 304. As a result, the UAV 100 can implement more missions in a wider variety of terrains. Both military and commercial (e.g., police, firefighters, border patrol, forest service, and security) users of the UAV 100 may benefit from the improved versatility of the UAV 100.

It should be understood that the illustrated embodiments are examples only and should not be taken as limiting the scope of the present invention. For example, the invention may be used in other VTOL vehicles. The claims should not be read as limited to the described order or elements unless stated to that effect. Therefore, all embodiments that come within the scope and spirit of the following claims and equivalents thereto are claimed as the invention.

We claim:

1. A method for landing an unmanned air vehicle on an inclined surface, the method comprising: descending vertically above the inclined surface; detecting a pressure differential caused by the inclined surface; counteracting motion caused by the pressure differential; detecting when the unmanned air vehicle contacts the inclined surface; when the unmanned air vehicle contacts the inclined surface, rotating the unmanned air vehicle until the unmanned vehicle has landed on the inclined surface; wherein counteracting motion caused by the pressure differential includes adjusting vanes of the unmanned air vehicle.

2. The method of claim 1, wherein counteracting motion caused by the pressure differential includes adjusting a throttle of the unmanned air vehicle.

3. The method of claim 1, wherein detecting when the unmanned air vehicle contacts the inclined surface includes a flight control system of the unmanned air vehicle detecting a landing touch condition.

4. The method of claim 1, wherein rotating the unmanned air vehicle includes adjusting vanes of the unmanned air vehicle.

5. The method of claim 4, wherein adjusting the vanes includes moving the vanes to counteract motion induced when the unmanned air vehicle contacts the inclined surface.

6. The method of claim 1, wherein rotating the unmanned air vehicle includes adjusting a throttle of the unmanned air vehicle.

7. The method of claim 6, wherein adjusting the throttle includes modulating the throttle to counteract gravitational forces.

* * * * *